US011256289B2

(12) United States Patent
Liu et al.

(10) Patent No.: US 11,256,289 B2
(45) Date of Patent: Feb. 22, 2022

(54) ROTATABLE DOOR STRUCTURE AND ELECTRONIC DEVICE CASING THEREWITH

(71) Applicant: Wistron Corporation, New Taipei (TW)

(72) Inventors: Yuanqing Liu, New Taipei (TW); Huiqiang He, New Taipei (TW); Dong-Ying Chen, New Taipei (TW); Chun-Hong Kuo, New Taipei (TW)

(73) Assignee: Wistron Corporation, New Taipei (TW)

( * ) Notice: Subject to any disclaimer, the term of this patent is extended or adjusted under 35 U.S.C. 154(b) by 71 days.

(21) Appl. No.: 16/854,922

(22) Filed: Apr. 22, 2020

(65) Prior Publication Data
    US 2021/0247801 A1    Aug. 12, 2021

(30) Foreign Application Priority Data
    Feb. 11, 2020    (CN) .......................... 202010086611.8

(51) Int. Cl.
    *G06F 1/16*    (2006.01)
    *G06F 1/18*    (2006.01)
(52) U.S. Cl.
    CPC .......... *G06F 1/1601* (2013.01); *G06F 1/1637* (2013.01); *G06F 1/181* (2013.01); *G06F 2200/1612* (2013.01)
(58) Field of Classification Search
    CPC ...... G06F 1/1601; G06F 1/181; G06F 1/1637; G06F 2200/1612
    See application file for complete search history.

(56) References Cited

U.S. PATENT DOCUMENTS

| 9,451,822 | B2* | 9/2016 | Gu ....................... F16M 11/041 |
| 9,856,909 | B1* | 1/2018 | Hsu ......................... E05D 3/122 |
| 9,891,664 | B2* | 2/2018 | Kim ...................... G06F 1/1681 |
| 10,716,224 | B2* | 7/2020 | Dunn ................. H05K 7/20954 |
| 2003/0063432 | A1 | 4/2003 | Farrow |
| 2018/0032112 | A1* | 2/2018 | Nguyen ................. A47B 21/06 |

FOREIGN PATENT DOCUMENTS

| CN | 102720413 B | 9/2015 |
| TW | 442720 | 6/2001 |
| TW | M405136 U1 | 6/2011 |

* cited by examiner

*Primary Examiner* — Rockshana D Chowdhury
(74) *Attorney, Agent, or Firm* — Winston Hsu

(57) ABSTRACT

A rotatable door structure includes a fixed casing, a door cover, and a hinge. The fixed casing has an opening. The door cover is pivotally connected to the fixed casing through the hinge. The hinge includes a shaft and a connection part. The shaft has a cam surface. The connection part has another cam surface and is rotatably connected to the shaft relative to a rotation axis. When the door cover rotates relative to the fixed casing through the hinge so as to expose the opening, the two cam surfaces abut against each other to move the door cover away relative to the fixed casing along the rotation axis. An electronic device casing includes the above rotatable door structure. Therein, the fixed casing includes an accommodating recess, which forms the opening and has at least one peripheral interface window.

20 Claims, 11 Drawing Sheets

ROTATABLE DOOR STRUCTURE AND ELECTRONIC DEVICE CASING THEREWITH

BACKGROUND OF THE INVENTION

1. Field of the Invention

The present invention relates to an electronic device casing, and more particularly to an electronic device casing with an openable door cover.

2. Description of the Prior Art

Some electronic devices have several peripheral connection ports. For avoidance of messy connection cables or hooking connection cables, these connection cables are usually fixed by a cable tie or other cable-arrangement structures. Some electronic devices further use a door cover to cover the connection cables for the protection of the connection cables and for the beautification of the electronic devices. In the latter, the door cover is usually fixed onto the casing of the electronic device by screwing with screws or hooking the casing with hooks. When a cable is required to be inserted in or extracted out, a user needs to detach the door cover from the casing. The method of screwing with screws needs corresponding tools for operation. Besides, it is easy to lose the detached screws. The method of hooking the casing with hooks may not require tools, but it requires the user's operating skills to prevent the hooks from breaking.

SUMMARY OF THE INVENTION

An objective of the invention is to provide a rotatable door structure, which uses a hinge with cam surfaces so that a door cover of the rotatable door structure can rotate and move axially.

A rotatable door structure according to the invention includes a fixed casing, a door cover, and a hinge. The fixed casing has an opening. The door cover is pivotally to the fixed casing through the hinge. The hinge includes a shaft and a connection part. The shaft has a first cam surface. The connection part and the shaft are rotatably connected relative to a rotation axis. The connection part has a second cam surface opposite to the first cam surface. Therein, when the door cover rotates through the hinge relative to fixed casing to expose the opening, the first cam surface and the second cam surface abut against each other to make the door cover move away relative to the fixed casing along the rotation axis. Thereby, the opening can be exposed without removing the door cover from the fixed casing. Furthermore, when rotating, the door cover moving along the rotation axis is conducive to avoidance of structural interference with the fixed casing.

Another objective of the invention is to provide an electronic device casing, which includes the above rotatable door structure, of which the door cover can rotate and move axially.

An electronic device casing according to the invention includes a rotatable door structure. The rotatable door structure includes a fixed casing, a door cover, and a hinge. The fixed casing has an accommodating recess, which forms an opening and has at least one peripheral interface window. The door cover is pivotally connected to the fixed casing through the hinge. The hinge includes a shaft and a connection part. The shaft has a first cam surface. The connection part is rotatably connected to the shaft relative to a rotation axis. The connection part has a second cam surface opposite to the first cam surface. Therein, when the door cover rotates through the hinge relative to fixed casing to expose the opening, the first cam surface and the second cam surface abut against each other to make the door cover move away relative to the fixed casing along the rotation axis. Thereby, the opening can be exposed without removing the door cover from the fixed casing. A user can manipulate objects in the accommodating recess through the opening, e.g. inserting or extracting connection cables. Furthermore, when rotating, the door cover moving along the rotation axis is conducive to avoidance of structural interference with the fixed casing or the objects in the accommodating recess.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
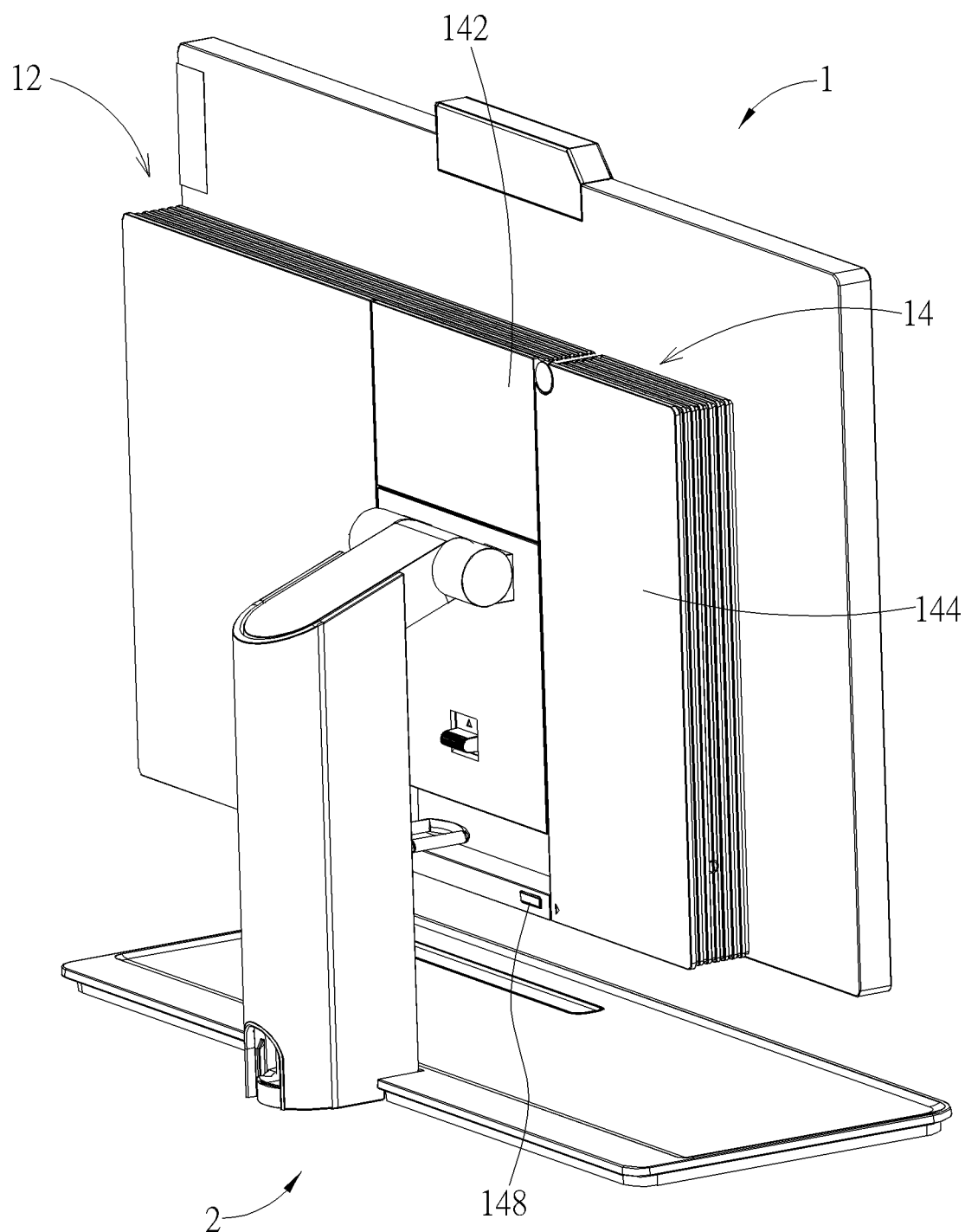
FIG. 1 is a schematic diagram illustrating a back side of an electronic device casing according to an embodiment.
Figure 2:
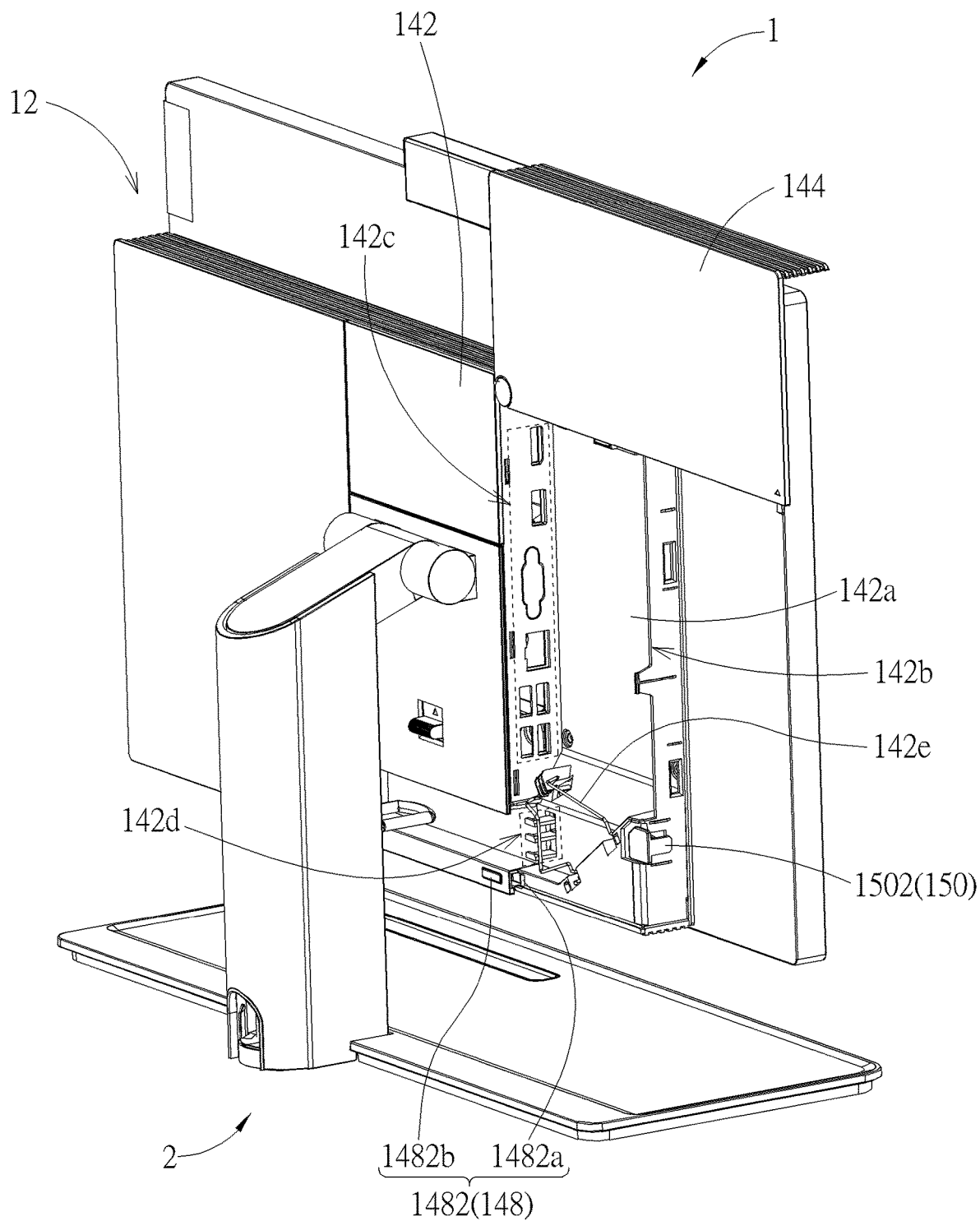
FIG. 2 is a schematic diagram illustrating the electronic device casing in FIG. 1, of which a rotatable door structure is at an open status.
Figure 3:
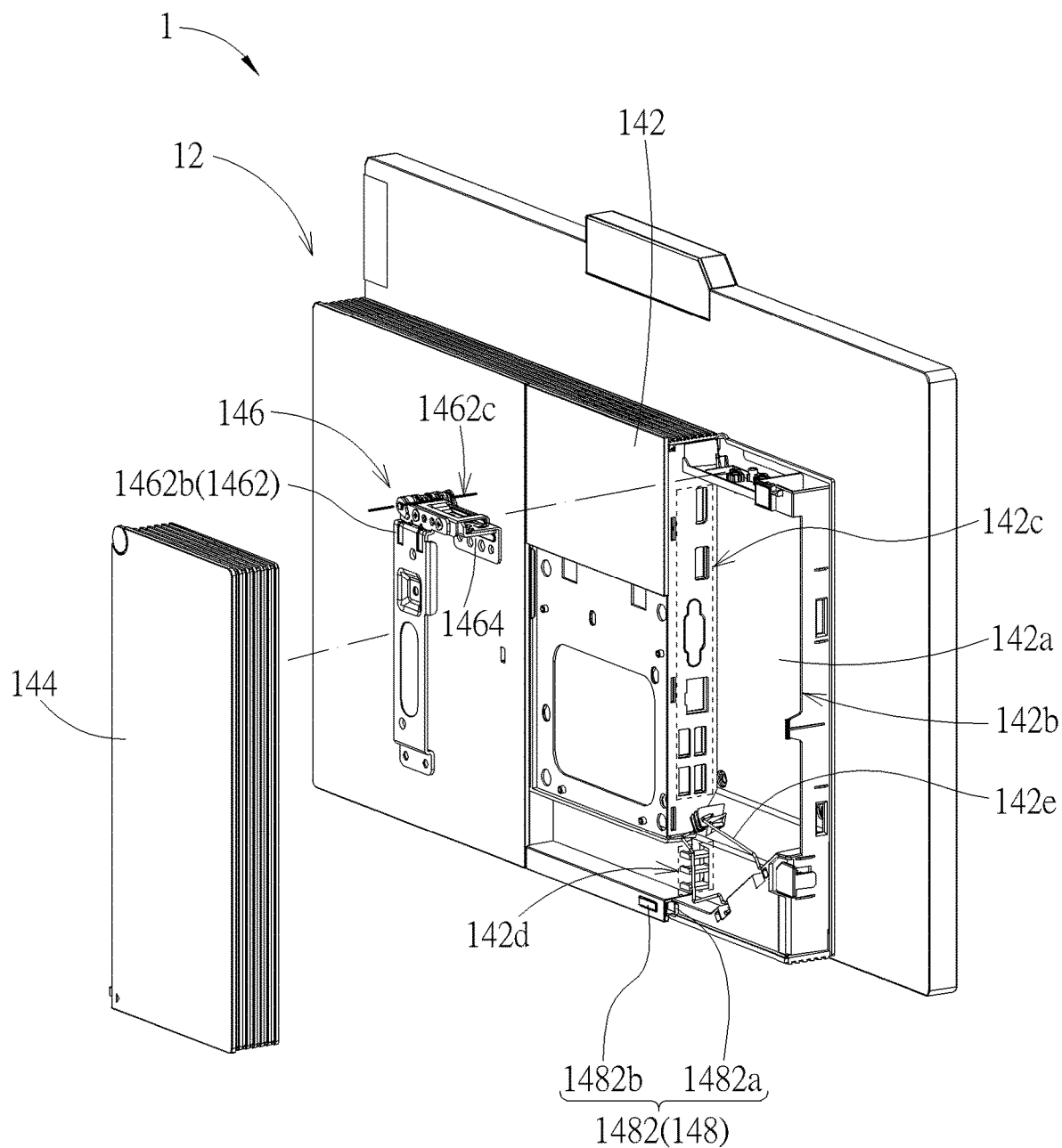
FIG. 3 is a partially exploded view of the electronic device casing in FIG. 1.

Please refer to FIG. 1 to FIG. 3. An electronic device casing 1 according to an embodiment can be used in, but not limited to, all-in-one PCs, smart TVs, monitors, and so on. The electronic device casing 1 is supported by a mount 2 for convenience of disposing the electronic device casing 1 on a desk. The electronic device casing 1 includes a back casing assembly 12, on which a rotatable door structure 14 is disposed. The rotatable door structure 14 includes a fixed casing 142, a door cover 144, and a hinge 146. The fixed casing 142 has an accommodating recess 142a forming an opening 142b. The door cover 144 is pivotally connected to the fixed casing 142 through the hinge 146, so that the door cover 144 can rotate relative to the fixed casing 142 to an open position for exposing the opening 142b (as shown by FIG. 2, in which the rotatable door structure 14 is at an open status), or to a closed position for covering the opening 142b (as shown by FIG. 1, in which the rotatable door structure 14 is at a closed status). Thereby, the opening 142*b* can be exposed without removing the door cover 144 from the fixed casing 142. Besides, the door cover 144 can be rotated between the opening position and the closed position, which is easy for users to operate.

Figure 4:
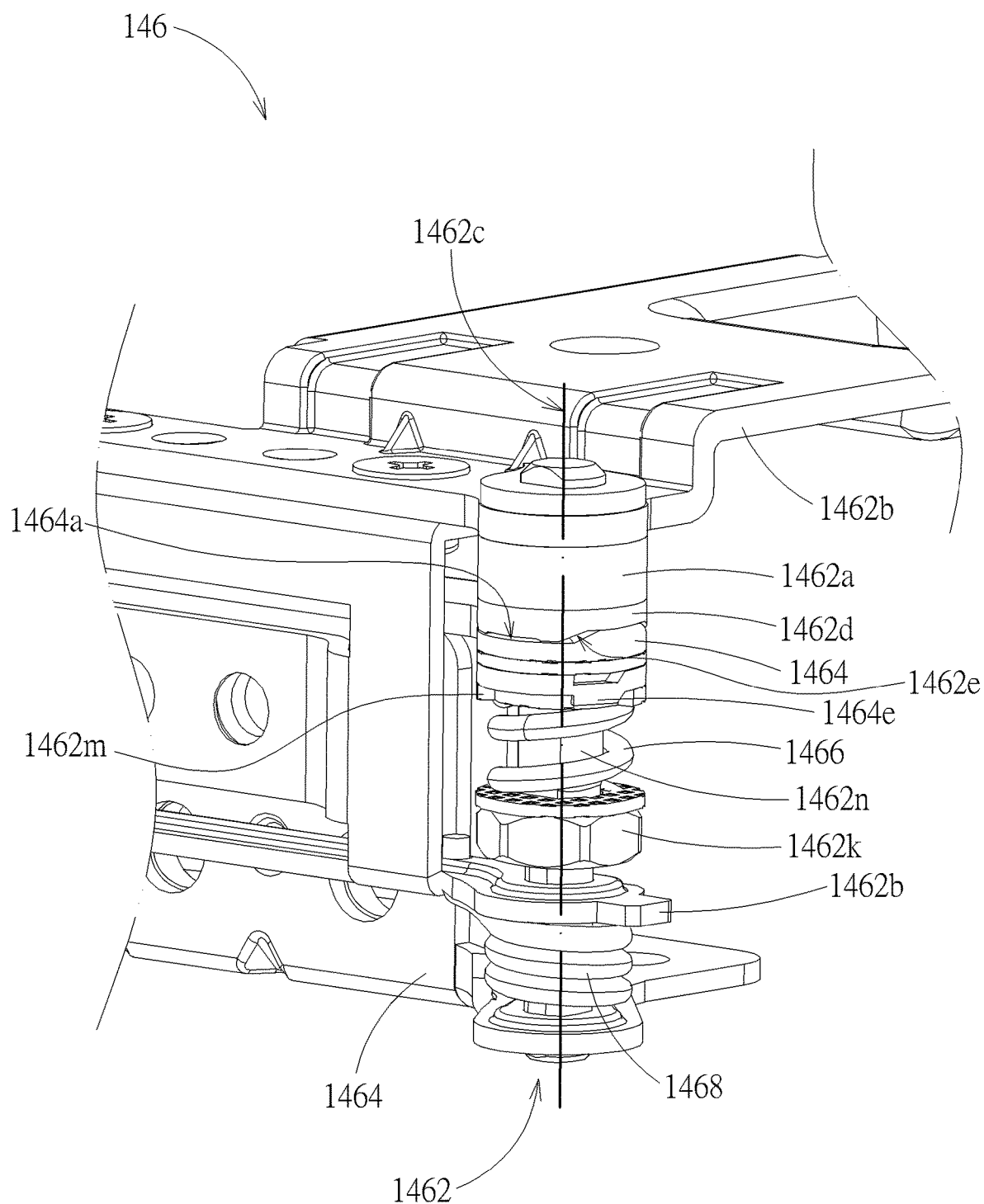
FIG. 4 is a schematic diagram illustrating a hinge in FIG. 3 in another viewpoint.
Figure 5:
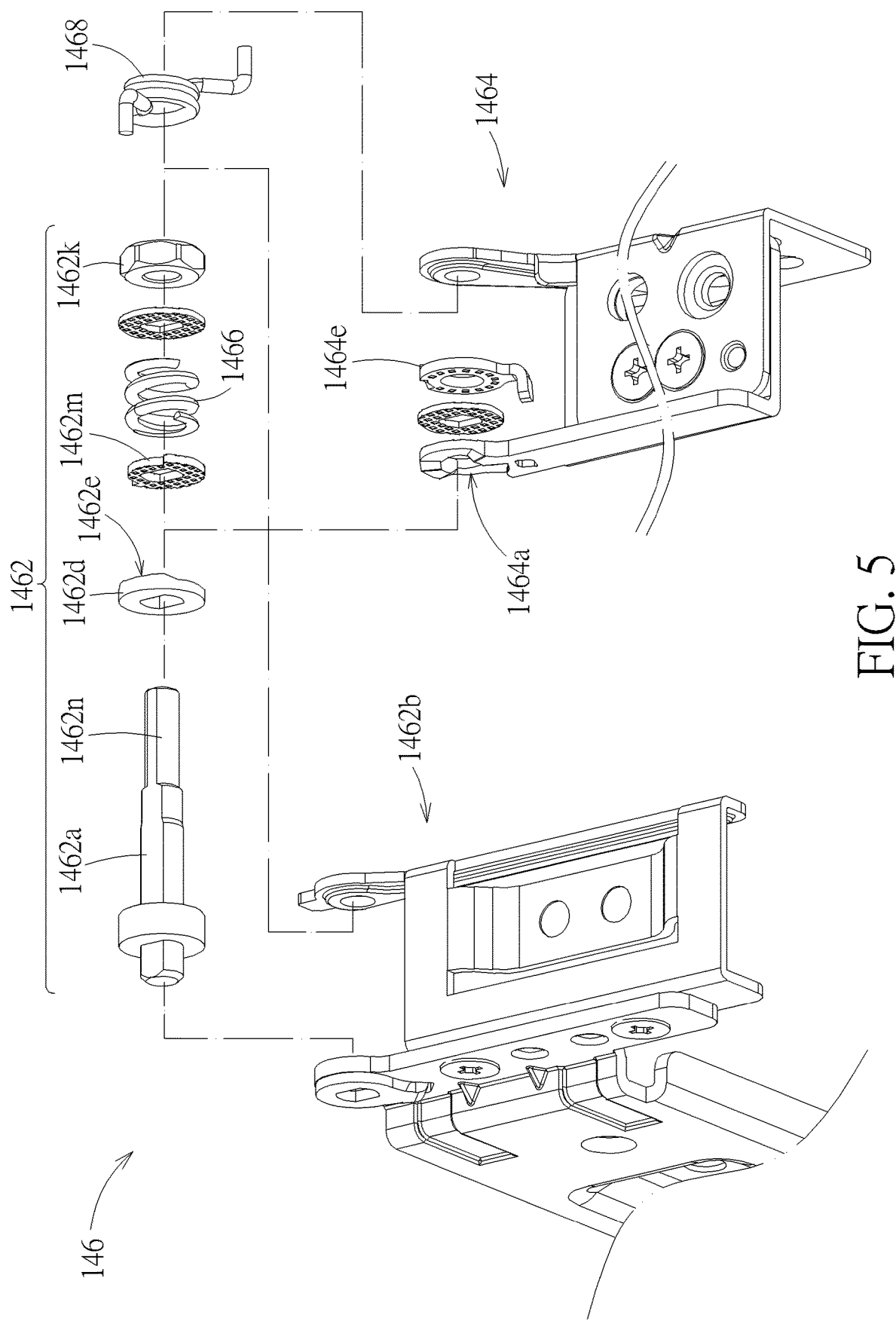
FIG. 5 is an exploded view of the hinge in FIG. 3.

Please also refer to FIG. 4 and FIG. 5. The hinge 146 includes a shaft 1462 and a connection part 1464. The shaft 1462 includes a shaft portion 1462*a* and a connection portion 1462*b*. The shaft portion 1462*a* has a rotation axis 1462*c* (indicated by a chain line in the figures). The connection portion 1462*b* and the shaft portion 1462*a* are fixedly connected relative to the rotation axis 1462*c*. The connection part 1464 and the shaft 1462 are rotatably connected relative to the rotation axis 1462*c* by rotatably putting the connection part 1464 on the shaft portion 1462*a*. The rotation axis 1462*c* is parallel to the orientation of the opening 142*b*. In the embodiment, the connection portion 1462*b* and the door cover 144 are fixedly connected. The connection part 1464 and the fixed casing 142 are fixedly connected so that the door cover 144 and the fixed casing 142 can relatively rotate through the hinge 146. In practice, the connection portion 1462*b* can be fixedly connected to the fixed casing 142 instead of the door cover 144, and the connection part 1464 is fixedly connected to the door cover 144 instead of the fixed casing 142, so that the door cover 144 and the fixed casing 142 still can relatively rotate through the hinge 146.

In the embodiment, the shaft 1462 further includes a ring part 1462*d* sleeved on the shaft portion 1462*a*. The ring part 1462*d* and the shaft portion 1462*a* are fixedly connected relative to the rotation axis 1462*c*. The ring part 1462*d* has a first cam surface 1462*e*; the connection part 1464 has a second cam surface 1464*a* correspondingly. The first cam surface 1462*e* and the second cam surface 1464*a* are disposed opposite each other and extend around the rotation axis 1462*c*. During the rotation of the door cover 144 relative to the fixed casing 142, the first cam surface 1462*e* and the second cam surface 1464*a* abut against each other and relatively slide, so as to change the relative positions of the first cam surface 1462*e* and the second cam surface 1464*a* along the rotation axis 1462*c*.

Figure 6:
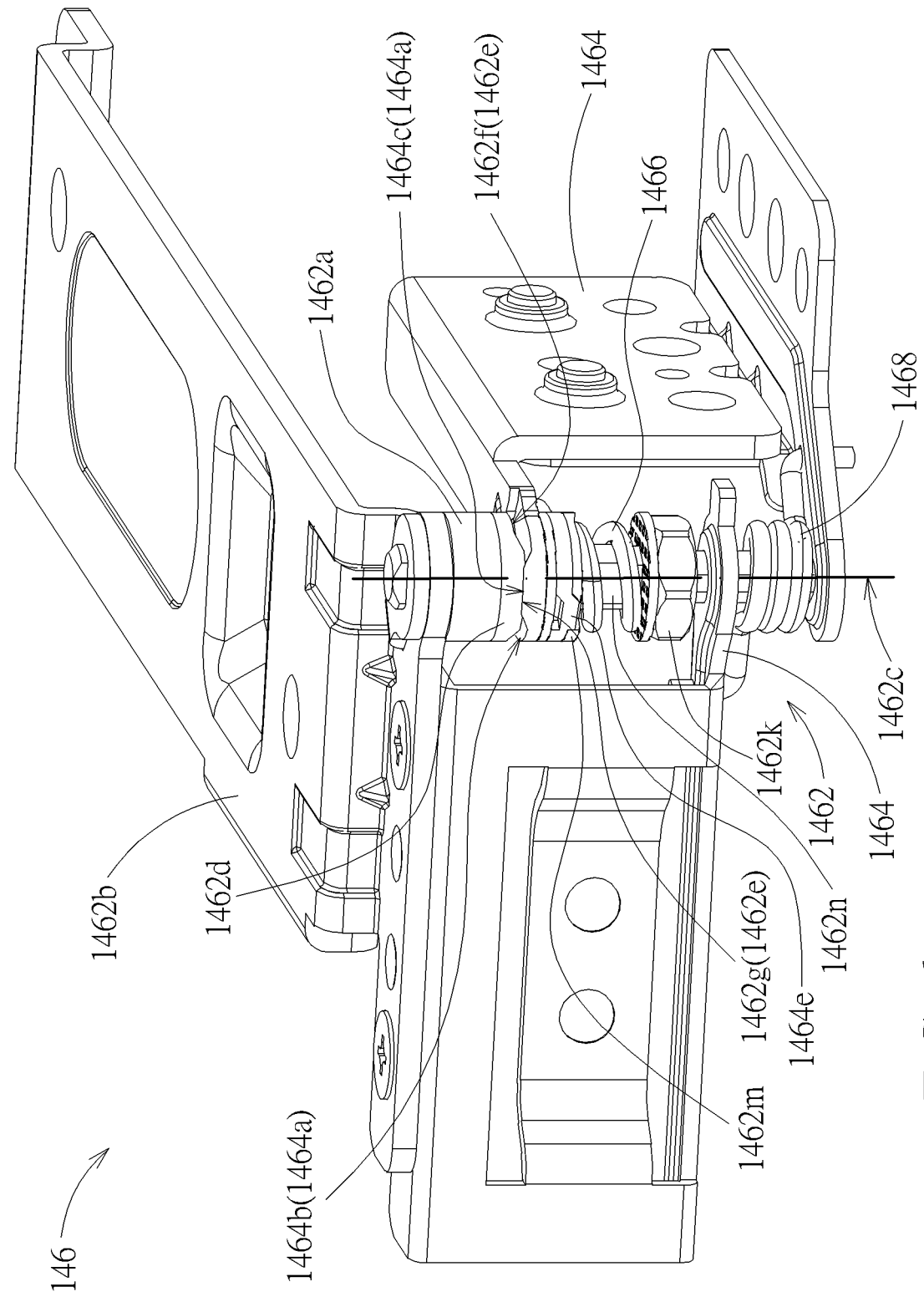
FIG. 6 is a side view of the hinge in FIG. 2.

As shown FIG. 1 and FIG. 4, when the door cover 144 is located at the closed position and covers the opening 142*b*, the first cam surface 1462*e* and the second cam surface 1464*a* approach each other. When the door cover 144 rotates through the hinge 146 relative to the fixed casing 142 to expose the opening 142*b*, the first cam surface 1462*e* and the second cam surface 1464*a* abut against each other to make the first cam surface 1462*e* and the second cam surface 1464*a* move away relative to each other, so that the door cover 144 moves away relative to the fixed casing along the rotation axis 1462*c*, as shown by FIG. 2 and FIG. 6. The movement of the door cover 144 along the rotation axis 1462*c* helps to avoid structural interference of the door cover 144 with the fixed casing 142 or objects in the accommodating recess 142*a* when the door cover 144 rotates. The displacement depends on the profiles of the first cam surface 1462*e* and the second cam surface 1464*a*.

Figure 7:
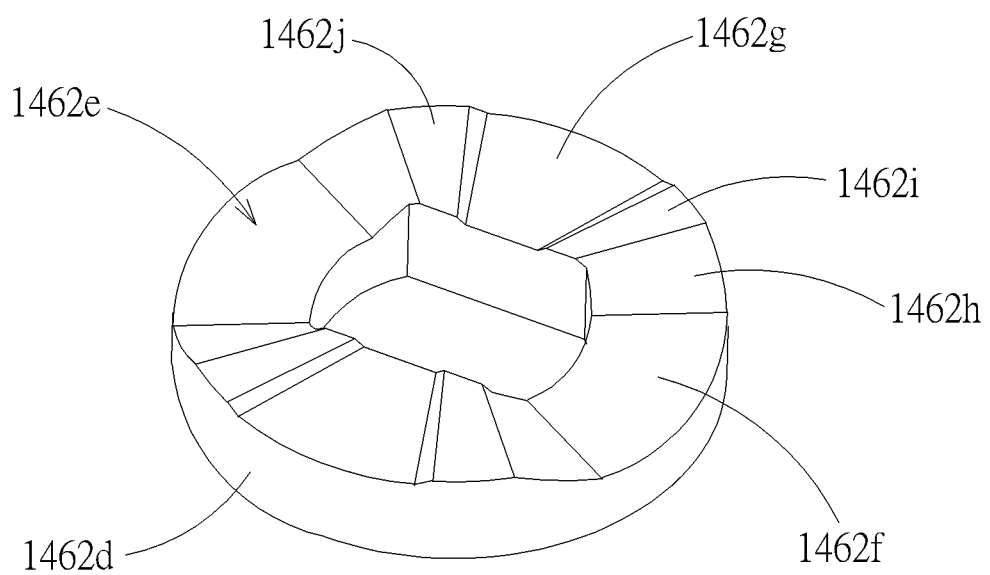
FIG. 7 is a schematic diagram illustrating a ring part of a shaft in FIG. 5.
Figure 8:
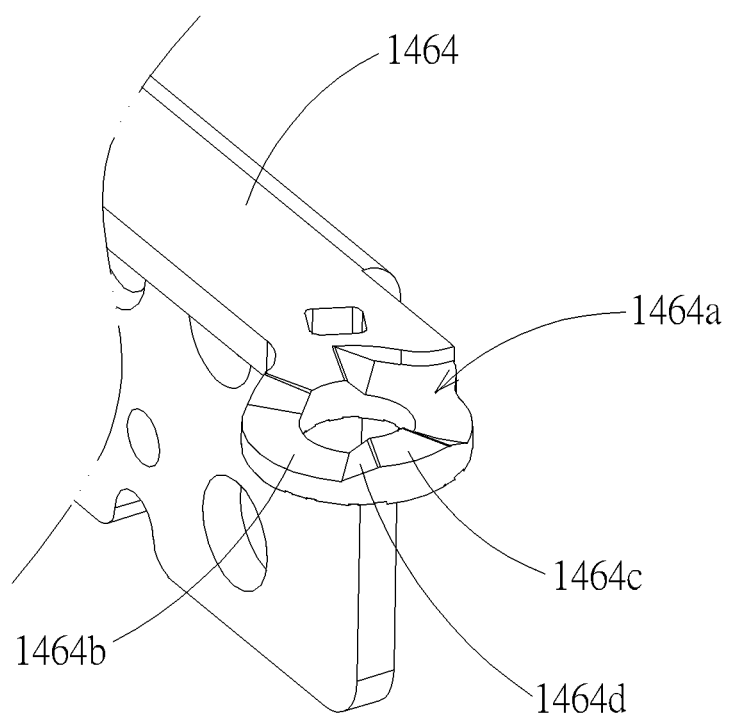
FIG. 8 is a schematic diagram illustrating a portion of a connection part in FIG. 5.
Figure 9:
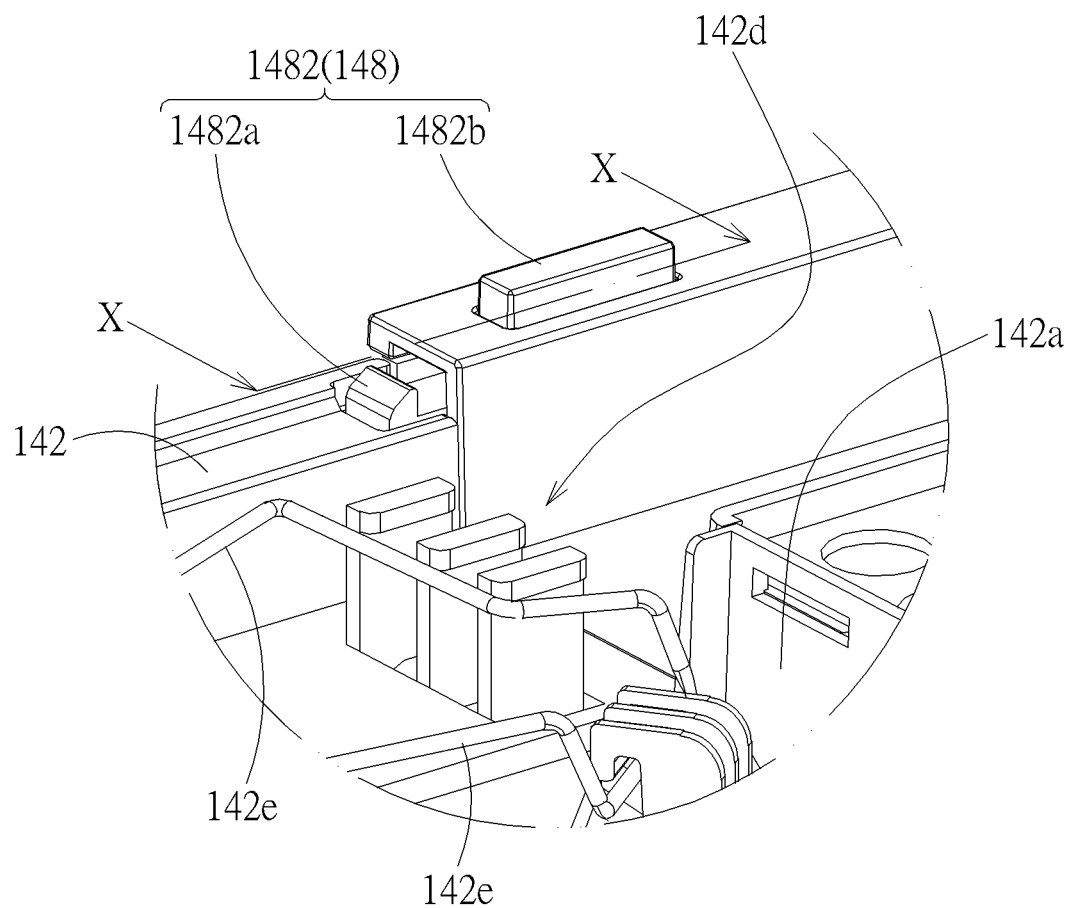
FIG. 9 is a schematic diagram illustrating a latch structure in FIG. 3.
Figure 10:
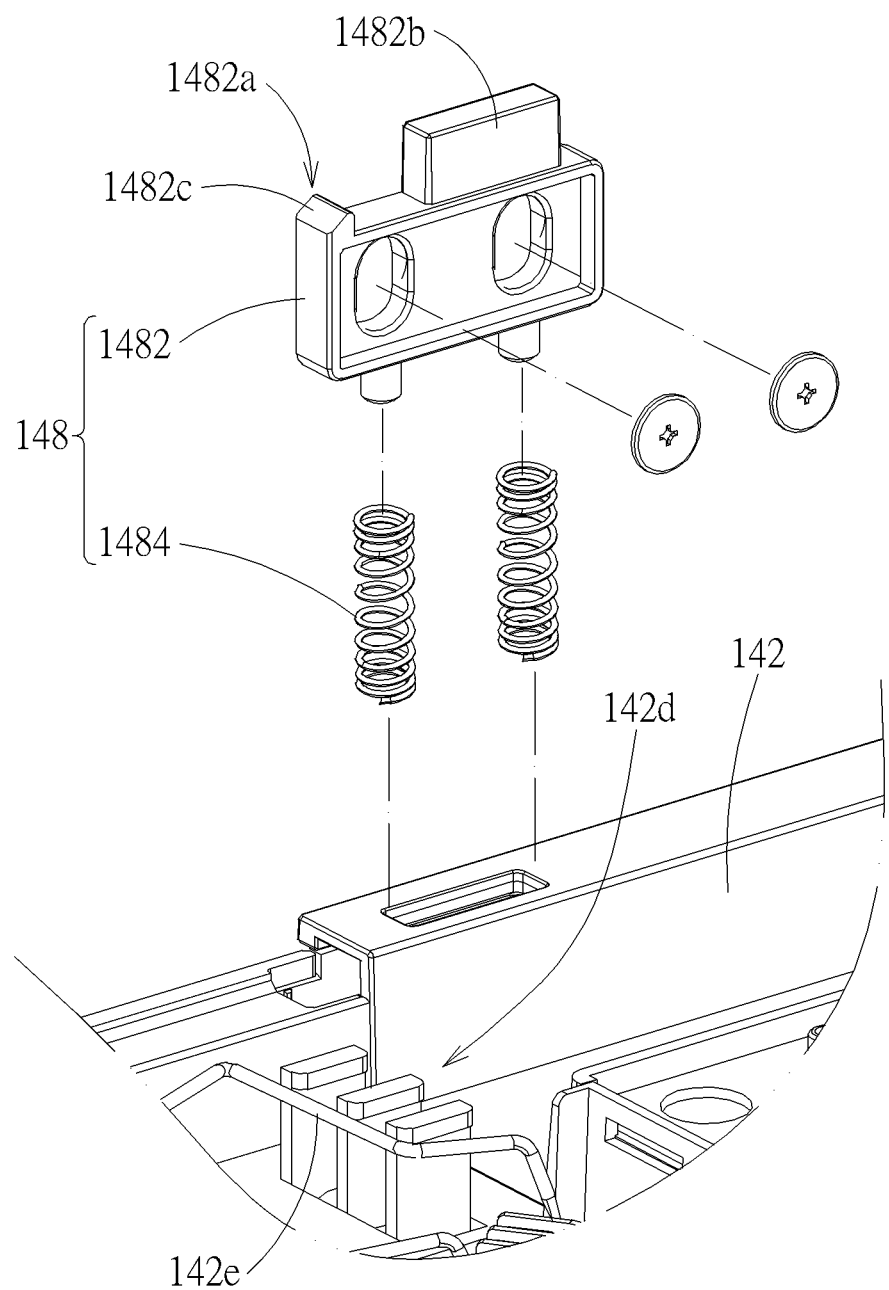
FIG. 10 is an exploded view of the latch structure in FIG. 9.
Figure 11:
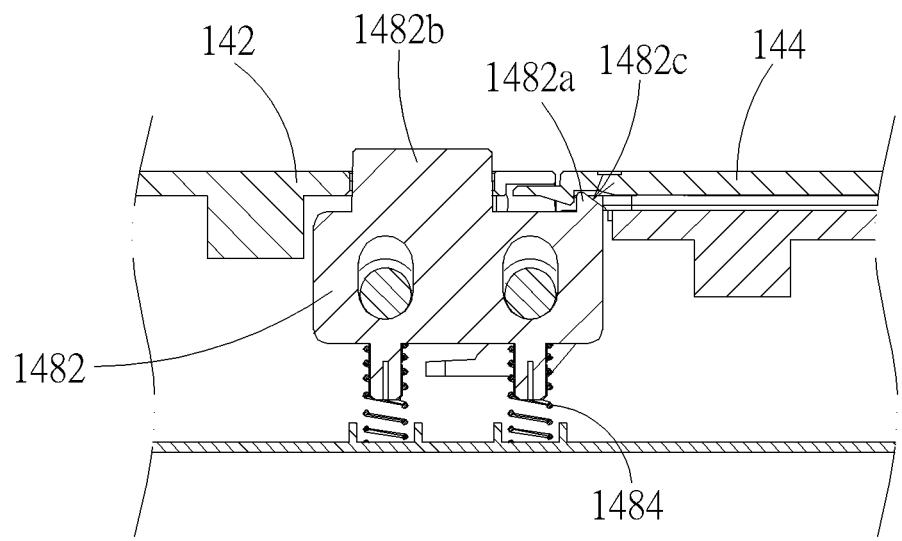
FIG. 11 is a sectional view of the latch structure along the line X-X in FIG. 9.
Figure 12:
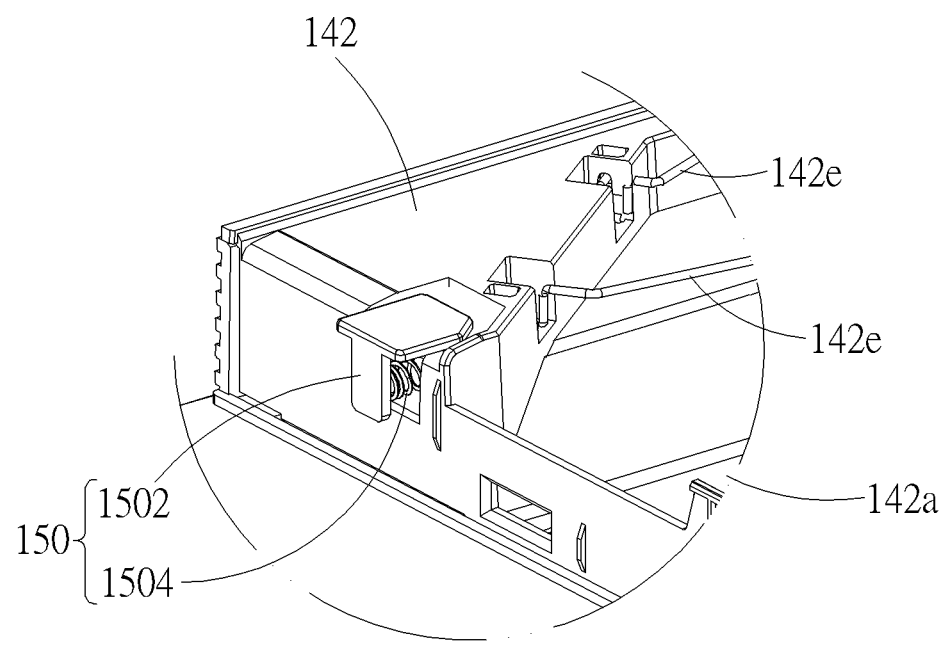
FIG. 12 is a schematic diagram illustrating a pushing structure in FIG. 3.
Figure 13:
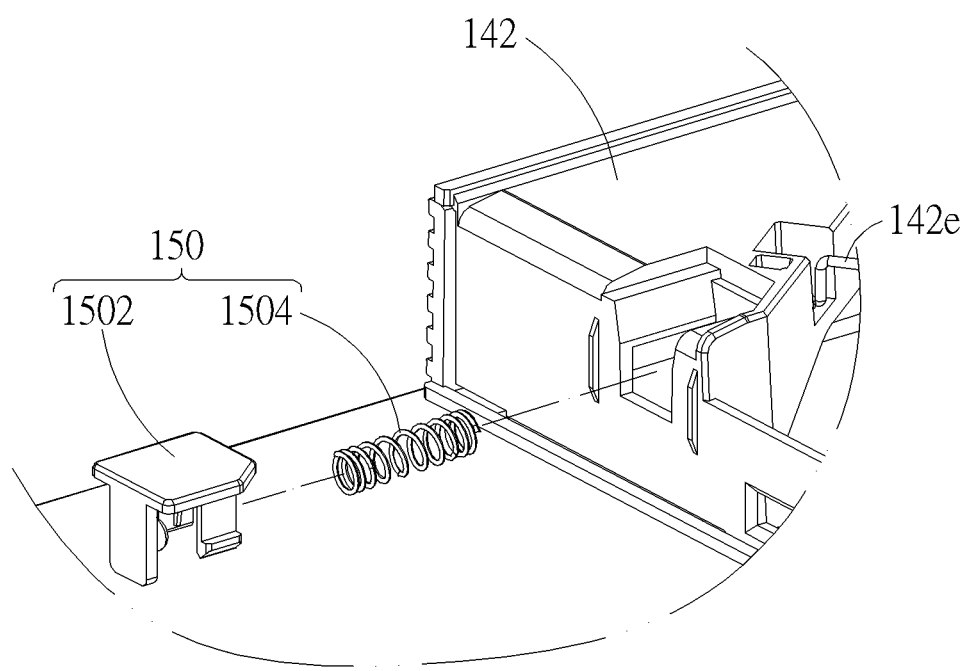
FIG. 13 is an exploded view of the pushing structure in FIG. 12.

Please refer to FIG. 5 and FIG. 7. In the embodiment, the first cam surface 1462*e* includes a first horizontal surface 1462*f*, a second horizontal surface 1462*g*, and a first slanting surface 1462*h*. The first horizontal surface 1462*f* and the second horizontal surface 1462*g* extend perpendicular to and around the rotation axis 1462*c*. The first horizontal surface 1462*f* and the second horizontal surface 1462*g* are staggered along the rotation axis 1462*c* (i.e. disposed non-coplanar). The first slanting surface 1462*h* is located between the first horizontal surface 1462*f* and the second horizontal surface 1462*g*. Please refer to FIG. 5 and FIG. 8. The second cam surface 1464*a* includes a third horizontal surface 1464*b*, a fourth horizontal surface 1464*c*, and a second slanting surface 1464*d*. The third horizontal surface 1464*b* and the fourth horizontal surface 1464*c* extend perpendicular to and around the rotation axis 1462*c*. The third horizontal surface 1464*b* and the fourth horizontal surface 1464*c* are staggered along the rotation axis 1462*c* (i.e. disposed non-coplanar). The second slanting surface 1464*d* is located between the third horizontal surface 1464*b* and the fourth horizontal surface 1464*c*. When the door cover 144 covers the opening 142*b* (i.e. being at the closed position), the first horizontal surface 1462*f* faces the fourth horizontal surface 1464*c*, as shown by FIG. 1 and FIG. 4. When the door cover 144 rotates relative to the fixed casing 142 to expose the opening 142*b* (i.e. being at the open position), the second horizontal surface 1462*g* faces the fourth horizontal surface 1464*c*, as shown by FIG. 2 and FIG. 6.

Furthermore, as shown by FIG. 7, the second horizontal surface 1462*g* protrudes relative to the first horizontal surface 1462*f* along the rotation axis 1462*c*. A protruding portion 1462*i* is formed between the second horizontal surface 1462*g* and the first slanting surface 1462*h* and protrudes along the rotation axis 1462*c*. During the rotation of the door cover 144 from the closed position to the open position, the second horizontal surface 1462*g* will not abut against the fourth horizontal surface 1464*c* until the protruding portion 1462*i* slides over the second slanting surface 1464*d* and the fourth horizontal surface 1464*c*. Thereby, also referring to FIG. 4 and FIG. 6 to FIG. 8, when the protruding portion 1462*i* slides on the second slanting surface 1464*d*, the relative distance between the first cam surface 1462*e* and the second cam surface 1464*a* along the rotation axis 1462*c* increases. When the protruding portion 1462*i* slides on the fourth horizontal surface 1464*c*, the relative distance between the first cam surface 1462*e* and the second cam surface 1464*a* along the rotation axis 1462*c* remains unchanged. After the protruding portion 1462*i* slides beyond the fourth horizontal surface 1464*c*, the relative distance between the first cam surface 1462*e* and the second cam surface 1464*a* along the rotation axis 1462*c* decreases a little. The changing of the relative distance can provide tactile feedback to users when rotating the door cover 144 and also is conducive to keeping the second horizontal surface 1462*g* in abutting against the fourth horizontal surface 1464*c*, i.e. locating the door cover 144 at the open position. Furthermore, in the embodiment, another protruding portion 1462*j* is formed at another side of the first cam surface 1462*e* opposite to the second horizontal surface 1462*g*. The door cover 144 can be located at the open position more stably by the two protruding portions 1462*i* and 1462*j*.

In addition, please refer to FIG. 4 to FIG. 6. In the embodiment, the shaft 1462 includes a first limitation portion 1462*m*, which is realized by the outer periphery structure of a washer sleeved on the shaft portion 1462*a*. The washer is fixedly connected to the shaft portion 1462*a* relative to the rotation axis 1462*c*. The connection part 1464 includes a second limitation portion 1464*e*, which is realized by the outer periphery structure of a washer that fits the main body of the connection part 1464 and is rotatably sleeved on the shaft portion 1462*a*. When the door cover 144 rotates relative to the fixed casing 142 to the open position so as to expose the opening 142*b* (as shown by FIG. 2), the first limitation portion 1462*m* abuts against the second limitation portion 1464e (as shown by FIG. 6). The structural configuration is conducive to locating the door cover 144 at the open position more stably.

As shown FIG. 4 and FIG. 5, in the embodiment, the hinge 146 further includes an elastic structure 1466. The elastic structure 1466 abuts against and between the shaft 1462 and the connection part 1464 so that the first cam surface 1462e and the second cam surface 1464a abut against each other. In the embodiment, the elastic structure 1466 is a spiral spring sleeved on the shaft portion 1462a. Two ends of the spiral spring abut against the shaft portion 1462a and the connection part 1464 for providing elastic force, so that the first cam surface 1462e and the second cam surface 1464a can keep in abutting against each other. In practice, the elastic structure 1466 also can be realized by other springs, e.g. rubber spring (e.g. but not limited to showing a cylinder structure), spring washer set, and so on.

Furthermore, in the embodiment, the shaft 1462 includes an adjusting part 1462k adjustably connected to the shaft portion 1462a. The elastic structure 1466 abuts against and between the adjusting part 1462k and the connection part 1464. The adjusting part 1462k is operable to adjust the elastic force produced by the elastic structure 1466. In the embodiment, the shaft portion 1462a has a screw portion 1462n. The adjusting part 1462k is a nut adjustably engaged with the screw portion 1462n. In addition, in practice, that the first cam surface 1462e and the second cam surface 1464a abut against each other is not limited to be achieved by the elastic force produced by the elastic structure 1466. For example, the connection part 1464 shows a C-shaped structure and is rotatably connected to the shaft 1462. The two ends of the C-shaped structure respectively show a cantilever, which has structural elasticity and can produce elastic force to keep the first cam surface 1462e and the second cam surface 1464a in abutting against each other. For another example, the disposition of the hinge 146 is restricted, e.g. disposed vertically (i.e. the rotation axis 1462c is parallel to the gravity direction) so that the gravity force of the connection part 1464 or the shaft 1462 can keep the first cam surface 1462e and the second cam surface 1464a in abutting against each other. The structural configuration also can achieve the above-mentioned interaction between the first cam surface 1462e and the second cam surface 1464a and the effect thereof; that is, when rotating, the door cover 144 can move relative to the fixed casing 142 along the rotation axis 1462c due to the fact that the first cam surface 1462e and the second cam surface 1464a in abutting against each other.

Please refer to FIG. 1, FIG. 3, and FIG. 9 to FIG. 11. The rotatable door structure 14 further includes a latch structure 148. When the door cover 144 covers the opening 142b, the fixed casing 142 holds the door cover 144 through the latch structure 148 so that the door cover 144 can remain at the closed position. The latch structure 148 includes a sliding part 1482, slidably disposed on the fixed casing 142, and a spring 1484. The sliding part 1482 has a holding portion 1482a and a manipulation portion 1482b exposed out of the fixed casing 142. The spring 1484 is disposed between the sliding part 1482 and the fixed casing 142 to drive the holding portion 1482a to hold the door cover 144. The manipulation portion 1482b is operable to disengage the holding portion 1482a from the door cover 144 (e.g. by a user pressing a manipulation portion 1482b). In the embodiment, the spring 1484 is a spiral spring; however, in practice, the spring 1484 can be replaced with an elastic structure, e.g. a curved cantilever extending from the sliding part 1482. The curved cantilever also can drive the holding portion 1482a to hold the door cover 144. Furthermore, in the embodiment, the holding portion 1482a further has a guiding surface 1482c (e.g. but not limited to a slanting surface or curved surface). When the door cover 144 rotates from the open position and approaches the closed position (e.g. by the user rotating the door cover 144 by hand), an edge of the door cover 144 can abut against the guiding surface 1482c to slide the sliding part 1482. Until the door cover 144 reaches the closed position, the sliding part 1482 is driven by the spring 1484 to return the original position. Then the holding portion 1482a holds the door cover 144 again.

Please refer to FIG. 1, FIG. 3, FIG. 12 and FIG. 13. The rotatable door structure 14 further includes a pushing structure 150. When the door cover 144 covers the opening 142b, the fixed casing 142 pushes the door cover 144 through the pushing structure 150. When the holding portion 1482a is disengaged from the door cover 144 (e.g. by the user pressing the manipulation portion 1482b), the pushing structure 150 can push the door cover 144 to rotate relative to the fixed casing 142. The pushing structure 150 includes a sliding part 1502, slidably disposed on the fixed casing 142, and a spring 1504, disposed between the sliding part 1502 and the fixed casing 142 to drive the sliding part 1502 to push the door cover 144. In the embodiment, the spring 1504 is a spiral spring; however, in practice, the spring 1504 can be replaced with an elastic structure, e.g. a curved cantilever extending from the sliding part 1502. The curved cantilever also can drive the sliding part 1502 to push the door cover 144.

Furthermore, as shown by FIG. 1 and FIG. 4, in the embodiment, when the door cover 144 is located at the closed position and covers the opening 142b, the first slanting surface 1462h and the second slanting surface 1464d are separate, so that when the holding portion 1482a is disengaged from the door cover 144 (e.g. by the user pressing the manipulation portion 1482b), the door cover 144 is pushed by the sliding part 1502 of the pushing structure 150 so as to easily rotate an angle relative to the fixed casing 142 from the closed position toward the open position (as shown by FIG. 2), for example but not limited to, until the first slanting surface 1462h begins to abut against the second slanting surface 1464d; thereby, the opening 142b is partially exposed. In practice, the angle can be set to but not limited to 10 degrees. Afterwards, the user can rotate the door cover 144 by hand until the door cover 144 reaches the open position. Therein, in practice, it is practicable to design the door cover 144 to be rotated an angle (e.g. but not limited to 30 degrees) from the closed position; at the moment, the protruding portion 1462i reaches the fourth horizontal surface 1464c. Furthermore, in practice, it is practicable to design the door cover 144 to be rotated from the closed position to the open position by an angle, for example but not limited to 90 degrees.

In addition, as shown by FIG. 1 and FIG. 4, in the embodiment, the hinge 146 further includes a torsion spring 1468, of which two ends are connected to the connection portion 1462b and connection part 1464 of the shaft 1462 respectively. The torsion spring 1468 drives the door cover 144 to rotate relative to fixed casing 142 toward the open position (as shown by FIG. 2). When the holding portion 1482a is disengaged from the door cover 144 (e.g. by the user pressing the manipulation portion 1482b), the torsion spring 1468 can drive the door cover 144 to rotate relative to the fixed casing 142 until the first slanting surface 1462h abuts against the second slanting surface 1464d, which can expose the opening 142b partially. From another aspect, the torsion spring 1468 can perform the function of the pushing structure 150, so it is practicable to dispose any of the torsion spring 1468 and the pushing structure 150 for the beginning of the rotation of the door cover 144 (from the closed position). In practice, it is also practicable to equip the rotatable door structure 14 with the both. In addition, in practice, it is practicable to design the elasticity of the torsion spring 1468 so that the elastic force produced by the torsion spring 1468 can drive the door cover 144 to rotate from the closed position toward the open position to make the protruding portion 1462*i* reach the fourth horizontal surface 1464*c*, even to make the door cover 144 reach the open position. For this instance, the pushing structure 150 is unnecessary.

As discussed above, the user can manipulate the rotatable door structure 14 by single hand, which is very convenient. Furthermore, in the embodiment, the door cover 144 is pivotally connected to the fixed casing 142 through the hinge 146. Therein, the shaft 1462 and the door cover 144 are fixedly connected, and the connection part 1464 and the fixed casing 142 are fixedly connected; however, it is not limited thereto in practice. For example, the shaft 1462 is fixedly connected to the fixed casing 142 instead while the connection part 1464 is fixedly connected to the door cover 144 instead, which also can achieve the pivotal connection of the door cover 144 and the fixed casing 142 through hinge 146. In addition, as shown by FIG. 1 and FIG. 2, in the embodiment, the accommodating recess 142*a* has at least one peripheral interface window 142*c* (indicated by a dashed frame in FIG. 2) for dispose connectors (not shown in the figures) of, for example but not limited to, network connection interface, connection interface of universal serial bus, video and audio connection interface, power connection interface, and so on. The accommodating recess 142*a* can accommodate connection cables (not shown in the figures). When the door cover 144 is located at the closed position, the connectors and connection cables in the accommodating recess 142*a* are under protection, and the back casing assembly 12 can have a beautiful appearance. When the door cover 144 is located at the open position, the opening 142*b* is exposed. The user can manipulate objects in the accommodating recess 142*a* through the opening 142*b*, e.g. inserting or extracting the connection cables. Furthermore, in the embodiment, the fixed casing 142 includes at least one cable-arrangement slot 142*d* (indicated by a dashed frame in FIG. 2) for communicating the accommodating recess 142*a* and an external space out of the electronic device casing 1. When the door cover 144 covers the opening 142*b*, the door cover 144 also covers the at least one cable-arrangement slot 142*d*. Furthermore, in the embodiment, an elastic clip 142*e* is disposed across the at least one cable-arrangement slot 142*d* for fixing the cables passing through the cable-arrangement slot 142*d*.

In addition, in the embodiment, the rotatable door structure 14 is used for covering and protecting the peripheral interface connection ports; however, it is not limited thereto. For example, the rotatable door structure 14 also can be applied to other portions of the electronic device casing 1, e.g. a portion of the back casing assembly 12 corresponding to the mainboard in the electronic device casing 1. In this instance, when the door cover 144 is opened, components inside the electronic device casing 1, e.g. connection cables (e.g. flat cables), electronic components (e.g. memory modules) and so on, can be exposed through the opening 142*b*. Then the user can manipulate these components. Furthermore, for example, the rotatable door structure 14 also can be applied to other devices or structures having inner space; then the user can manipulate objects in the inner space through the rotatable door structure 14.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotatable door structure, comprising:
a fixed casing having an opening;
a door cover; and
a hinge, the door cover being pivotally connected to the fixed casing through the hinge, the hinge comprising a shaft and a connection part, the shaft having a first cam surface, the connection part and the shaft being rotatably connected relative to a rotation axis, the connection part having a second cam surface opposite to the first cam surface;
wherein when the door cover rotates relative to the fixed casing through the hinge to expose the opening, the first cam surface and the second cam surface abut against each other to make the door cover move away relative to the fixed casing along the rotation axis.

2. The rotatable door structure according to claim 1, wherein the first cam surface extends around the rotation axis and comprises a first horizontal surface, a second horizontal surface, and a first slanting surface between the first horizontal surface and the second horizontal surface.

3. The rotatable door structure according to claim 2, wherein the second cam surface comprises a third horizontal surface, a fourth horizontal surface, and a second slanting surface between the third horizontal surface and the fourth horizontal surface, when the door cover covers the opening, the first horizontal surface faces the fourth horizontal surface, and when the door cover rotates relative to the fixed casing to expose the opening, the second horizontal surface faces the fourth horizontal surface.

4. The rotatable door structure according to claim 3, wherein the second horizontal surface protrudes relative to the first horizontal surface along the rotation axis, and a protruding portion is formed between the second horizontal surface and the first slanting surface and protrudes along the rotation axis.

5. The rotatable door structure according to claim 3, wherein when the door cover covers the opening, the first slanting surface and the second slanting surface are separate, and when the door cover rotates an angle relative to the fixed casing, the first slanting surface abuts against the second slanting surface.

6. The rotatable door structure according to claim 5, wherein the hinge comprises a torsion spring that is connected to the shaft and the connection part, and the torsion spring drives the door cover to rotate relative to the fixed casing until the first slanting surface abuts against the second slanting surface to expose the opening.

7. The rotatable door structure according to claim 5, further comprising a pushing structure, wherein when the door cover covers the opening, the fixed casing is operable to push the door cover through the pushing structure to drive the door cover to rotate relative to the fixed casing until the first slanting surface abuts against the second slanting surface to expose the opening.

8. The rotatable door structure according to claim 7, wherein the pushing structure comprises a sliding part and a spring, the sliding part is slidably disposed on the fixed casing, and the spring is disposed between the sliding part and the fixed casing to drive the sliding part to push the door cover.

9. The rotatable door structure according to claim 1, further comprising a latch structure, wherein when the door cover covers the opening, the fixed casing holds the door cover through the latch structure.

10. The rotatable door structure according to claim 9, wherein the latch structure comprises a sliding part and a spring, the sliding part is slidably disposed on the fixed casing and has a holding portion and a manipulation portion, the manipulation portion is exposed out of the fixed casing, the spring is disposed between the sliding part and the fixed casing to drive the holding portion to hold the door cover, and the manipulation portion is operable to disengage the holding portion from the door cover.

11. The rotatable door structure according to claim 1, wherein the shaft comprises a first limitation portion, the connection part comprises a second limitation portion, and when the door cover rotates relative to the fixed casing to expose the opening, the first limitation portion abuts against the second limitation portion.

12. The rotatable door structure according to claim 1, further comprising an elastic structure, wherein the elastic structure abuts against and between the shaft and the connection part to make the first cam surface and the second cam surface abut against each other, one of the shaft and the connection part is fixedly connected to the fixed casing, and the other one of the shaft and the connection part is fixedly connected to the door cover.

13. The rotatable door structure according to claim 12, wherein the elastic structure comprises a spring.

14. The rotatable door structure according to claim 12, wherein the shaft comprises an adjusting part, the elastic structure abuts against and between the adjusting part and the connection part, and the adjusting part is operable to adjust an elastic force produced by the elastic structure.

15. The rotatable door structure according to claim 14, wherein the shaft comprises a screw portion, and the adjusting part is a nut and is adjustably engaged with the screw portion.

16. An electronic device casing, comprising:
a rotatable door structure, comprising:
  a fixed casing having an accommodating recess, the accommodating recess forming an opening and having at least one peripheral interface window;
  a door cover; and
  a hinge, the door cover being pivotally connected to the fixed casing through the hinge, the hinge comprising a shaft and a connection part, the shaft having a first cam surface, the connection part and the shaft being rotatably connected relative to a rotation axis, the connection part having a second cam surface opposite to the first cam surface;
wherein when the door cover rotates through the hinge relative to the fixed casing to expose the opening, the first cam surface and the second cam surface abut against each other to make the door cover move away relative to the fixed casing along the rotation axis.

17. The electronic device casing according to claim 16, wherein the fixed casing comprises at least one cable-arrangement slot that communicates the accommodating recess and an external space of the electronic device casing, and when the door cover covers the opening, the door cover covers the at least one cable-arrangement slot.

18. The electronic device casing according to claim 16, wherein the first cam surface extends around the rotation axis and comprises a first horizontal surface, a second horizontal surface, and a first slanting surface between the first horizontal surface and the second horizontal surface, the second cam surface comprises a third horizontal surface, a fourth horizontal surface, and a second slanting surface between the third horizontal surface and the fourth horizontal surface, when the door cover covers the opening, the first horizontal surface faces the fourth horizontal surface, and when the door cover rotates relative to the fixed casing to expose the opening, the second horizontal surface faces the fourth horizontal surface.

19. The electronic device casing according to claim 18, further comprising a pushing structure, wherein when the door cover covers the opening, the first slanting surface and the second slanting surface are separate, and the fixed casing is operable to push the door cover through the pushing structure to drive the door cover to rotate relative to the fixed casing until the first slanting surface abuts against the second slanting surface to expose the opening.

20. The electronic device casing according to claim 16, further comprising an elastic structure, wherein the elastic structure abuts against and between the shaft and the connection part to make the first cam surface and the second cam surface abut against each other, one of the shaft and the connection part is fixedly connected to the fixed casing, the other one of the shaft and the connection part is fixedly connected to the door cover, the shaft comprises an adjusting part, the elastic structure abuts against and between the adjusting part and the connection part, and the adjusting part is operable to adjust an elastic force produced by the elastic structure.

* * * * *